United States Patent
Deiss et al.

(10) Patent No.: US 7,241,855 B2
(45) Date of Patent: Jul. 10, 2007

(54) METHOD FOR THE MANUFACTURE OF POLYESTERS

(75) Inventors: Stefan Deiss, Harxheim (DE); Michael Reisen, Frankfurt am Main (DE); Karl-Heinz Heldmann, Raunheim (DE); Eckhard Seidel, Frankfurt am Main (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 11/236,878

(22) Filed: Sep. 27, 2005

(65) Prior Publication Data

US 2006/0069214 A1   Mar. 30, 2006

(30) Foreign Application Priority Data

Sep. 28, 2004 (DE) ............. 10 2004 047 076

(51) Int. Cl.
*C08G 63/02*   (2006.01)
*C08G 63/127*   (2006.01)
*C08G 63/16*   (2006.01)
*C08G 63/78*   (2006.01)

(52) U.S. Cl. ............. 528/272; 528/275; 528/279; 528/280; 528/281; 528/282; 528/283; 528/285; 528/302; 528/308; 528/308.6; 528/486; 528/488; 528/491; 528/499; 524/783; 524/785; 524/786; 524/794

(58) Field of Classification Search ............. 528/271, 528/275, 279, 280, 281, 282, 283, 285, 298, 528/301, 302, 307, 308, 308.6, 272, 488, 528/491, 499, 486, 28.6; 524/783, 785, 786, 524/794
See application file for complete search history.

(56) References Cited

U.S. PATENT DOCUMENTS

| 5,686,553 | A | 11/1997 | Tai et al. | |
|---|---|---|---|---|
| 2004/0176635 | A1* | 9/2004 | Lin et al. | 560/80 |
| 2005/0159578 | A1* | 7/2005 | Parker et al. | 528/272 |
| 2005/0159617 | A1* | 7/2005 | Parker et al. | 562/485 |
| 2005/0228164 | A1* | 10/2005 | Lin et al. | 528/272 |

FOREIGN PATENT DOCUMENTS

| DE | 696 29 439 | 6/2004 |
|---|---|---|
| WO | 2004/052820 | 6/2004 |
| WO | WO 2004/052821 | 6/2004 |
| WO | WO 2004/052822 | 6/2004 |
| WO | WO 2004/063139 | 7/2004 |

OTHER PUBLICATIONS

Search Report, PCT/US 03/31957, 3 pages.
Patent Abstract of Japan; Pub. 2004231642 A; Aug. 2004; Appl. 2003425196; Dec. 2003; Mitsubishi Chemicals Corp.; Method for centrifugally separating slurry containing aromatic carboxylic acid.

* cited by examiner

*Primary Examiner*—Duc Truong
(74) *Attorney, Agent, or Firm*—Jonathan Myers; Andrew Wilford

(57) ABSTRACT

A method is described for the manufacture of polyesters of aromatic dicarboxylic acids with aliphatic and/or cycloaliphatic dials, in which an aromatic dicarboxylic acid in the presence of a monocarboxylic acid or a mixture of a monocarboxylic acid present in a saturated solution with water or another suitable solvent is converted with an aliphatic or cycloaliphatic dial to a dicarboxylic acid alkanediolestercarboxylate and/or its oligomers, which are polycondensed in further process steps to the polyester.

18 Claims, 3 Drawing Sheets

METHOD FOR THE MANUFACTURE OF POLYESTERS

FIELD OF THE INVENTION

The invention relates to a method for the manufacture of polyesters starting from a saturated solution of an aromatic dicarboxylic acid and an aliphatic and/or a cycloaliphatic diol, wherein the aromatic dicarboxylic acid and the aliphatic and/or cycloaliphatic diol react with each other in the presence of a monocarboxylic acid or a solution of a monocarboxylic acid in water or another suitable solvent, and then are polycondensed to the polyester in further process steps.

BACKGROUND OF THE INVENTION

In International Patent Application WO 2004/035515 a method is described for the manufacture of a mixture of a dicarboxylic acid and a diol that is suitable for the manufacture of polyesters. For this purpose the dicarboxylic acid is suspended in water, decolorized by hydrogenation and the aqueous suspension obtained thereby reacts with the diol forming a hydroxyalkyl ester; the hydroxyalkyl ester is subsequently converted to the polyester. It is however disadvantageous that the esterification of the dicarboxylic acid ester, for example the terephthalate proves to be difficult and as a result necessitates special reaction conditions.

Special reaction conditions are even more necessary if for example terephthalic acid or another dicarboxylic acid is present in an acetic acid or monocarboxylic acid-water mixture, since under these reaction conditions the esterification with a diol occurs according to another mechanism and splitting of the ester formed is strongly favored.

Methods are know already from the International Patent Applications WO 2004/052820, WO 2004/052821 and WO 2004/052822 for the manufacture of polyethylene terephthalates in which the hydrogenation is carried out in an acetic acid medium. From International Patent Application WO 2004/063139 a method is known for manufacture of high purity polyethylene terephthalates in acetic acid medium without hydrogenation. Admittedly there the use of crude acetic acid polyethylene terephthalates and intermediate products for the further manufacture of polyesters is not described.

OBJECT OF THE INVENTION

The present invention therefore has the object to develop a method for the manufacture of polyesters, in which starting from a saturated solution of an aromatic dicarboxylic acid and an aliphatic and/or cycloaliphatic diol the previously identified disadvantages do not occur.

SUMMARY OF THE INVENTION

This object is thus achieved in accordance with the invention, in that an aromatic dicarboxylic acid in a saturated solution in the presence of a monocarboxylic acid or of a mixture of a monocarboxylic acid with water or another suitable solvent is converted with an aliphatic and/or cycloaliphatic diol, to a dicarboxylic acid alkanediolestercarboxylate and/or its oligomers, which are polycondensed in further process steps to the polyester.

Surprisingly reaction conditions could be found in accordance with the invention, which facilitated a conversion of the aromatic dicarboxylic acids present in a saturated solution with an alkanediol. In this manner dicarboxylic acid alkanediolester oligomers are formed whose hydroxyl end groups are for the most part available to esterify with a monocarboxylic acid for example acetic acid. In addition diolesters of the monocarboxylic acid employed are also formed in this reaction.

In this reaction it is evident that the concentration of dicarboxylic acid alkanediolestercarboxylates and their oligomers in the reaction mixture is higher the greater the concentration of monocarboxylic acid in the reaction mxture. Thus the solubility of the aromatic dicarboxylic acid in the reaction mixture increases. The dissolved aromatic dicarboxylic acid is essentially more reactive than the solid aromatic dicarboxylic acid. Through the reaction of the aromatic dicarboxylic acid with the alkanediol the solubility equilibrium is decisively influenced and the aromatic dicarboxylic acid which is dissolved thereby can then subsequently react with the alkanediol.

In parallel with that, at least a portion of the monocarboxylic acid initially reacts with the alkanediol and is then again released by transesterification with the aromatic dicarboxylic acid. It is especially advantageous if the alkanediol-monocarboxylates are already formed in a pre-reaction and then are available as reaction partner for the aromatic dicarboxylic acid, without having to split off water in the esterification and polycondensation process. A particularity of the method in accordance with the invention is that in contrast to the conventional terephthalic acid esterification in the polyethyleneterephthalate process, scarcely any dialkylglycol, that is for example diethyleneglycol in the PET process, is formed. For specialized applications, polyester with higher dialkyleneglycol content is necessary, so it is expedient to additionally feed the dialkyleneglycol into the process.

Further advantageous details of the invention are clarified below.

Accordingly for the method in accordance with the invention as aromatic dicarboxylic acids, terephthalic acid, isophthalic acid, diphenyldicarboxylic acid and/or naphthalene dicarboxylic acid are employed. Terephthalic acid is the preferred aromatic dicarboxylic acid, besides the isophthalic acid, diphenyldicarboxylic acid and/or naphthalenedicarboxylic acid in general at a concentration of 0 to 95 wt % in relation to the amount of terephthalic acid can be utilized.

In general the aliphatic diol has 2 to 16 C-atoms and the cycloaliphatic diol 5 to 12 C-atoms, preferred, however, are ethylene glycol, trimethyleneglycol, tetramethyleneglycol and cyclohexanedimethanol. Additionally a mixture of different aliphatic and/or cycloaliphatic diols can also be employed.

The monocarboxylic acids used are selected from the group consisting of acetic acid, formic acid, propionic acid, butyric acid, valeric acid and capronic acid. As a rule they are generally mixed with a solvent for their use. In addition a mixture of different monocarboxylic acids can also be employed. The total concentration of monocarboxylic acids in the reaction mixture can for example in the case of acetic acid amount to 5 to 99 wt %, in relation to the weight of the aromatic dicarboxylic acids employed.

It is also possible, instead of an aliphatic and/or cycloaliphatic diol to use one or a plurality of aliphatic alkanediolesters, so that the splitting off of water is avoided. Ethyleneglycoldiacetate is the preferred alkanediolester.

The reaction of the aromatic dicarboxylic acid with the aliphatic and/or cycloaliphatic diol in the presence of a monocarboxylic acid or solution of a monocarboxylic acid in water or another suitable solvent can be carried out either with or without a catalyst. A preferred catalyst is an element from the group Mg, Ca, Ba, Zn, Co, Al, Sb, Ti, Sn, Zr, Ge or a combination of several of these elements.

The mole ratio of the aromatic dicarboxylic acid to the aliphatic and/or cycloaliphatic diol amounts in general to 0.1:10 to 10:1 and the total concentration of the aromatic dicarboxylic acids generally lies between 0.1 and 50 wt %, in relation to the total amount of the reaction mixture, wherein before the reaction the aromatic dicarboxylic acids are in either the dissolved or undissolved form. The proportion of aliphatic and/or cycloaliphatic diol in the reaction mixture can lie between 0.1 and 70 wt %.

Reaction of the aromatic dicarboxylic acid with the alkane diols takes place under the reaction conditions in accordance with the invention at a temperature between 100 and 350° C. and a pressure of 700 mbar up to 100 bar. In a preferred embodiment the reaction takes place at a temperature between 150 and 300° C. The pressure is preferably between 2 and 40 bar, especially preferred 10 to 30 bar. Thereby for example terephthalic acid alkanediolester-oligomers are formed, whose hydroxyl end-groups are for the most part available with esterified acetic acid. Additionally, acetic acid diolesters are also formed if acetic acid is utilized as the monocarboxylic acid.

In carrying out the method in accordance with the invention it was evident that the concentration of oligomers of terephthalic acid alkanediolesters is higher the greater the concentration of the monocarboxylic acid in the reaction mixture. Also the dissolved terephthalic acid is essentially more reactive than the solid terephthalic acid which crystallizes out of solution. However in the method in accordance with the invention the solid terephthalic acid dissolves rapidly, since in the reaction of the dissolved terephthalic acid with the alkanediol the solubility equilibrium is decisively influenced.

In parallel with that at least a part of the monocarboxylic acid reacts initially with the alkanediol to form a monocarboxylic acid alkanediolester, from which the monocarboxylic acid is then liberated again by transesterification with the aromatic dicarboxylic acid.

As already mentioned it is advantageous, if the monocarboxylic acid alkanediolesters are formed in a pre-reaction and are then available as reaction partner of the aromatic dicarboxylic acid. Then the subsequent transesterifictions and polycondensations can occur without water splitting.

This approach is highly desirable because water due to its higher vaporization enthalpy should be removed from the reaction mixture as early as possible, so that from an energy standpoint the subsequent processes can be conducted as favorably as possible. The monocarboxylic acids such as acetic acid have an essentially lower vaporization enthalpy and are moreover useful for the further process as a solvent as well as esterification catalyst. Particularly for carrying out the method without addition of a special esterification catalyst the monocarboxylic acid takes over the catalyst function.

In general however the esterification of dicarboxylic acid alkanediolestercarboxylate and/or its oligomers is undertaken in presence of a catalyst, which is selected from the elements Mg, Ca, Ba, Zn, Co, Al, Sb, Ti, Sn, Zr, Ge or from a combination of these elements. The monocarboxylic acid liberated hereby, water and a part of the carboxylic acid alkanediolester are then removed from the reaction system via exhaust vapors and fed to a rectification column. There the carboxylic acid alkanediolester is separated as heaviest boiling condensate from the remaining low boiling fraction and fed back into the process.

In doing this it was surprisingly observed that under the rectification conditions the carboxylic acid alkanediolesters are at least partially hydrolyzed into monocarboxylic acid and alkanediol, so that the alkanediol can be recovered for return into the process. The resulting monocarboxylic acid from the rectification as well as part of the water can likewise be returned into the process.

The dicarboxylic acid alkanediolestercarboxylate formed in the method in accordance with the invention, and its oligomers can subsequently be reacted at a temperature between 100 and 350° C. and a pressure of 20 bar to 100 mbar in one or a plurality of further transesterification stages depending on the presence of free aromatic carboxyl groups with a defined amount of alkanediol and a suitable catalyst. In a preferred embodiment this reaction takes place at a temperature between 220 and 330° C. The pressure is preferably between 10 bar and 400 mbar.

So, in two further esterification stages for example, the first stage is preferably operated at 1-15 bar, especially preferred at 2-10 bar. The second stage is then preferably operated at 0.4-4 bar, especially preferred at 0.5-2.5 bar.

In these transesterification stages the freely forming monocarboxylic acid is also separated from the esters of the monocarboxylic acid and the dicarboxylic acid alkanediolesters and their oligomers, and is fed likewise with the reaction water from the esterification of the remaining free carboxyl groups as well as the excess alkanediol along with the exhaust vapors to the rectification column.

It is advantageous to bring the terephthalic acid esterification to a degree of conversion of more than 90%, so that the subsequent process can be conducted as appropriate for a conventional polyester process.

In the subsequent pre-polycondensation and polycondensation the carboxylic acid alkanediolester and/or its oligomers are subjected to conditions of temperature of 100-350° C. and a pressure of 2000 mbar to 0.1 mbar, as are conventional in the manufacture of polyesters.

It was moreover surprisingly determined that in the method in accordance with the invention, aliphatic ether components are formed only in amounts less than 0.1 wt %, which is very unusual for methods based on TPA.

The object of the invention therefore is also polyesters from aromatic dicarboxylic acids with aliphatic and/or cycloaliphatic diols, which are manufactured by means of the method in accordance with the invention, in which aliphatic ethers are formed only in amounts less than 0.1 wt % and the polyester contains aliphatic ethers only in amounts less than 0.1 wt %.

The invention is described in detail in the following examples which however shall not limit the invention. Thereby the aromatic reaction products as well as the unconverted terephthalic acid are determined by means of HPLC, while the liquid components are determined by Head-Space GC and the water concentration by Karl-Fischer titration.

The intrinsic viscosity (I.V. [dl/g]) was measured at 25° C. on a solution of 500 mg polyester in 100 ml of a mixture of phenol and 1,2-dichlorobenzene (3:2 parts by weight).

The COOH end-groups concentration in the polyester was determined by means of photometric titration of a solution of a polyester in a mixture of o-cresol and chloroform (70:30 parts by weight) with 0.05 N ethanolic potassium hydroxide against bromothymol blue indicator.

EXAMPLE 1

This example shows the reaction of terephthalic acid, isophthalic acid, ethyleneglycol, acetic acid and water. The reaction mixture employed was loaded into each of four unstirred pressure bombs leading to the following analysis.

TABLE 1

| | | |
|---|---|---|
| Water, demin. | 6.3 g | 5.6% |
| Acetic acid | 69.3 g | 61.3% |
| Ethyleneglycol | 13.4 g | 11.9% |
| Terephthalic acid | 21.8 g | 1.9% |
| TOTAL | 112.9 g | 100% |

The reaction mixture was heated in a reaction bomb under nitrogen at a temperature of 260° C. In each case after 15 min a bomb was taken from the aluminum block, cooled to room temperature, opened and the aromatic reaction product obtained subsequently analyzed by means of HPLC.

Figure 1:
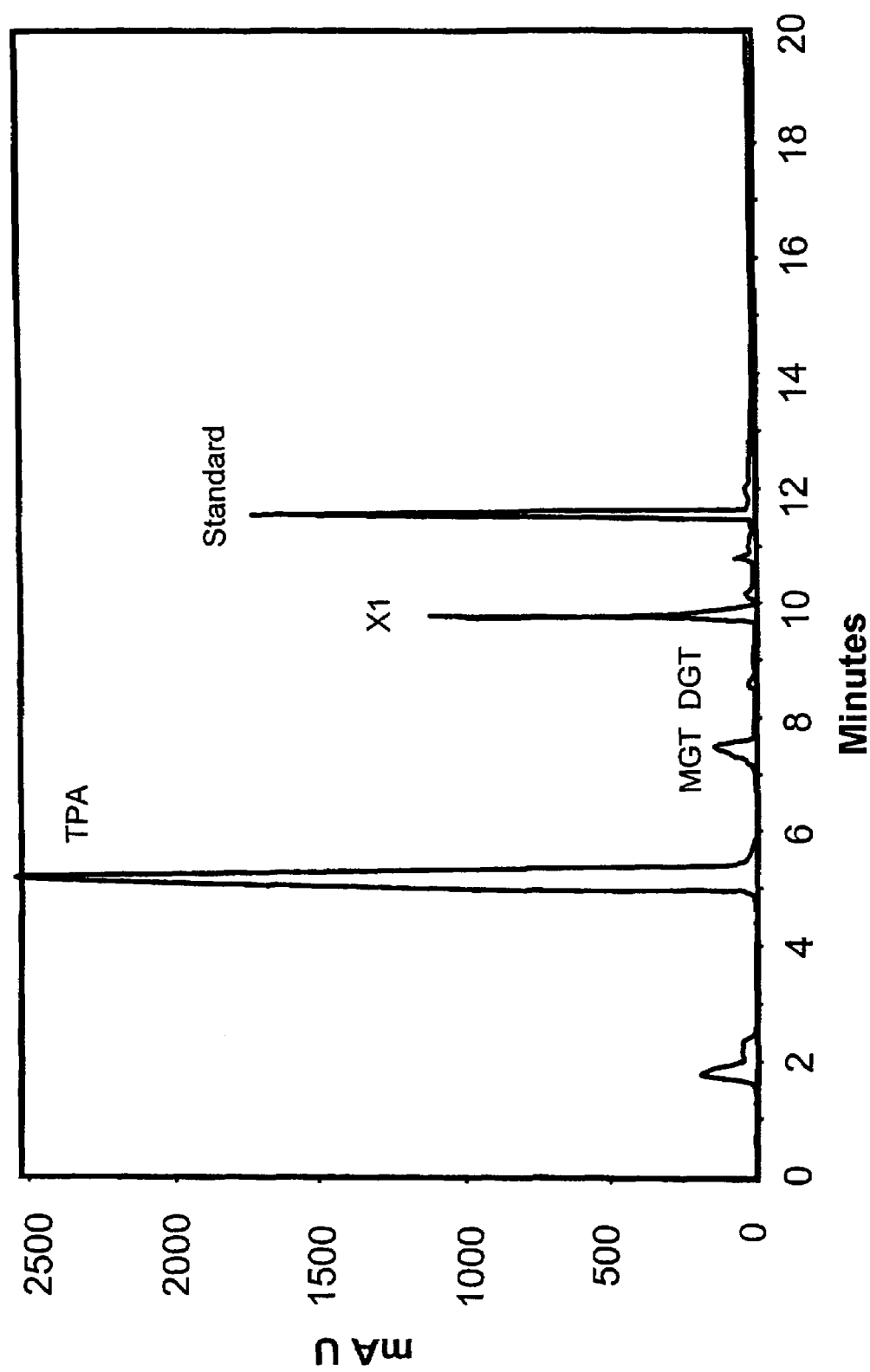
FIG. 1 is an HPLC chromatogram identifying all species present in the reaction of Example 1.

FIG. 1 shows the HPLC chromatogram obtained wherein in addition to a peak for unreacted terephthalic acid (TPA), terephthalic acid diethyleneglycolesterdiacetate (=X1) is found.

Monoglycolterephthalate (MGT) and diglycolterephthalate (DGT) are on the other hand only formed in very small amounts. Under the conditions given it appears that ethylene glycol (=EG) reacts firstly with the acetic acid and then in an ester exchange reaction with the terephthalic acid.

The concentrations of terephthalic acid diethyleneglycolester diacetate (=X1) are listed in the table below.

TABLE 1A

| Reaction time | Terephthalic acid diethyleneglycolesterdiacetate in the reaction mixture |
|---|---|
| 0 min | not detectable |
| 15 min | 0.62% |
| 30 min | 0.88% |
| 45 min | 1.28% |
| 60 min | 1.60% |

EXAMPLE 2

This example shows a similar reaction as in Example 1, only instead of ethylene glycol (=EG) ethylene glycoldiacetate (=EG-diacetate) was used and no acetic acid or water were employed.

Figure 2:
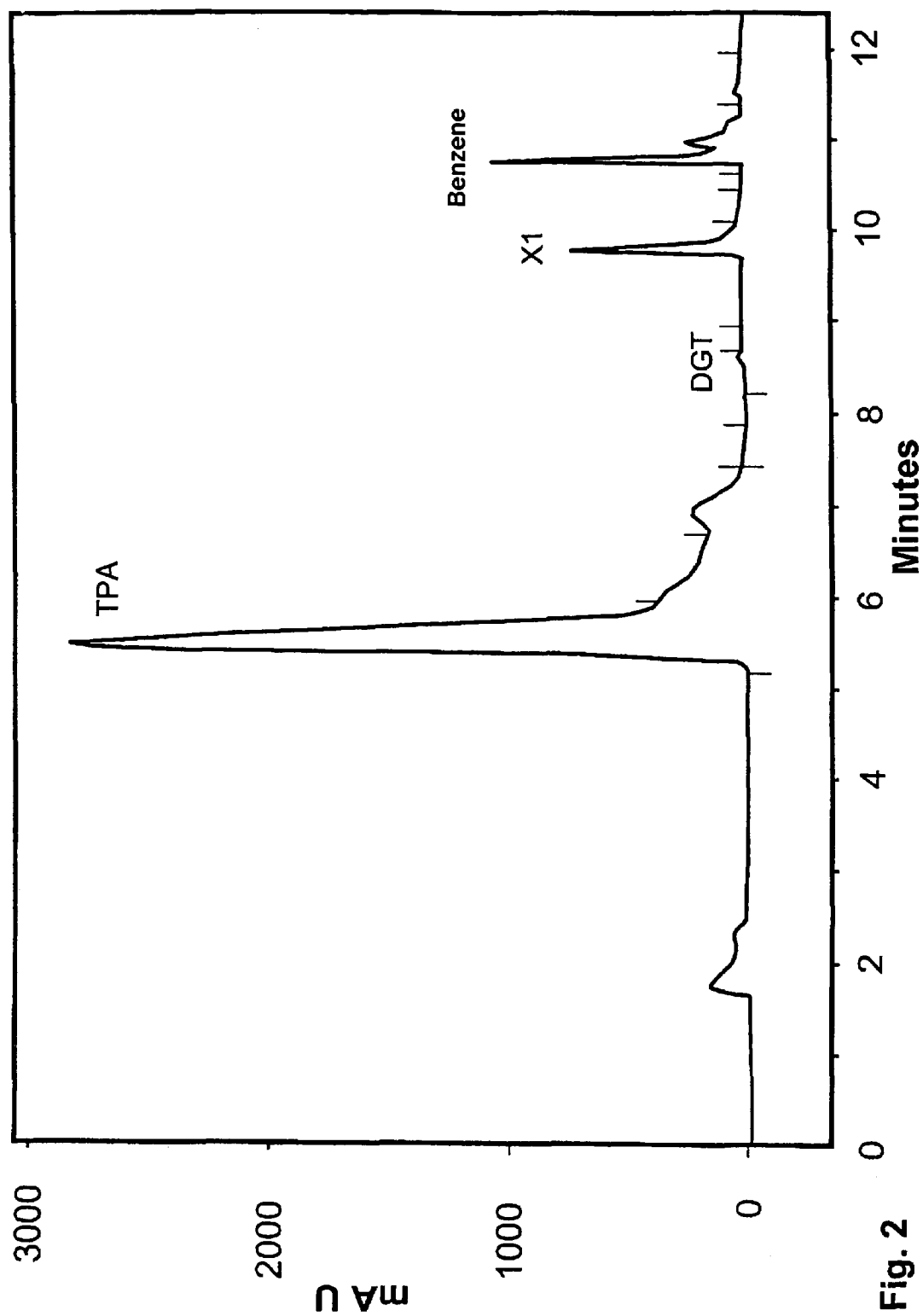
FIG. 2 is an HPLC chromatogram identifying all species present in the reaction of Example 2.

FIG. 2 shows the HPLC chromatogram, wherein in addition to terephthalic acid (TPA), as another peak terephthalic acid diethylenglycolsterdiacetate (=X1) and peaks at 7 min run time are evident, pointing to the presence of monoethyleneglycolterephthalate (=MGT) and monoethyleneglycol-terephthalateacetate. Surprisingly scarcely any diglycolterephthalate (=DGT) was formed, but instead of that various oligomers. This also represents evidence for the acetic acid-terephthalic acid route.

Benzene was used as internal standard.

EXAMPLE 3

The following starting quantities were placed in an electrically heated 2 liter autoclave.

TABLE 2

| | | |
|---|---|---|
| Water, demin. | 220 g | 17.5% |
| Acetic acid | 415 g | 32.9% |
| Ethylene glycol | 485 g | 38.5% |
| Terephthalic acid | 140 g | 11.1% |

The reactor was thoroughly purged with nitrogen before the test began. During the test it was stirred at about 750 rpm. The reactor was heated in under 45 min to 253° C. and then cooled back to room temperature in under 30 min. The analytical results are presented in Table 2A.

TABLE 2A

| | initial [wt %] | Test 1 [wt %] |
|---|---|---|
| TPA | 11.1 | 4.0 |
| Oligomers | — | 13.3 |
| EG-monoacetate | — | 19.5 |
| EG-Diacetate | — | 4.5 |
| DEG | — | — |
| EG | 38.5 | 21.6 |
| Acetic acid | 32.9 | 17.6 |
| Water | 17.5 | 19.5 |
| TOTAL | 100.0 | 100.0 |
| Oligomers | | |
| MGT | | 7.78 |
| DGT | | 2.47 |
| X1 | | 2.46 |
| 2GT | | 0.57 |
| TOTAL | | 13.3 |

X1 = terephthalic acid diethyleneglycolesterdiacetate
2GT = oligomer
EG-monoacetate = ethyleneglycol-monoacetate Surprisingly in contrast to the conventional terephthalic acid esterification, no diethyleneglycol was formed in the polyester process.

The conversion of terephthalic acid to ester products amounts to 64%.

Figure 3:
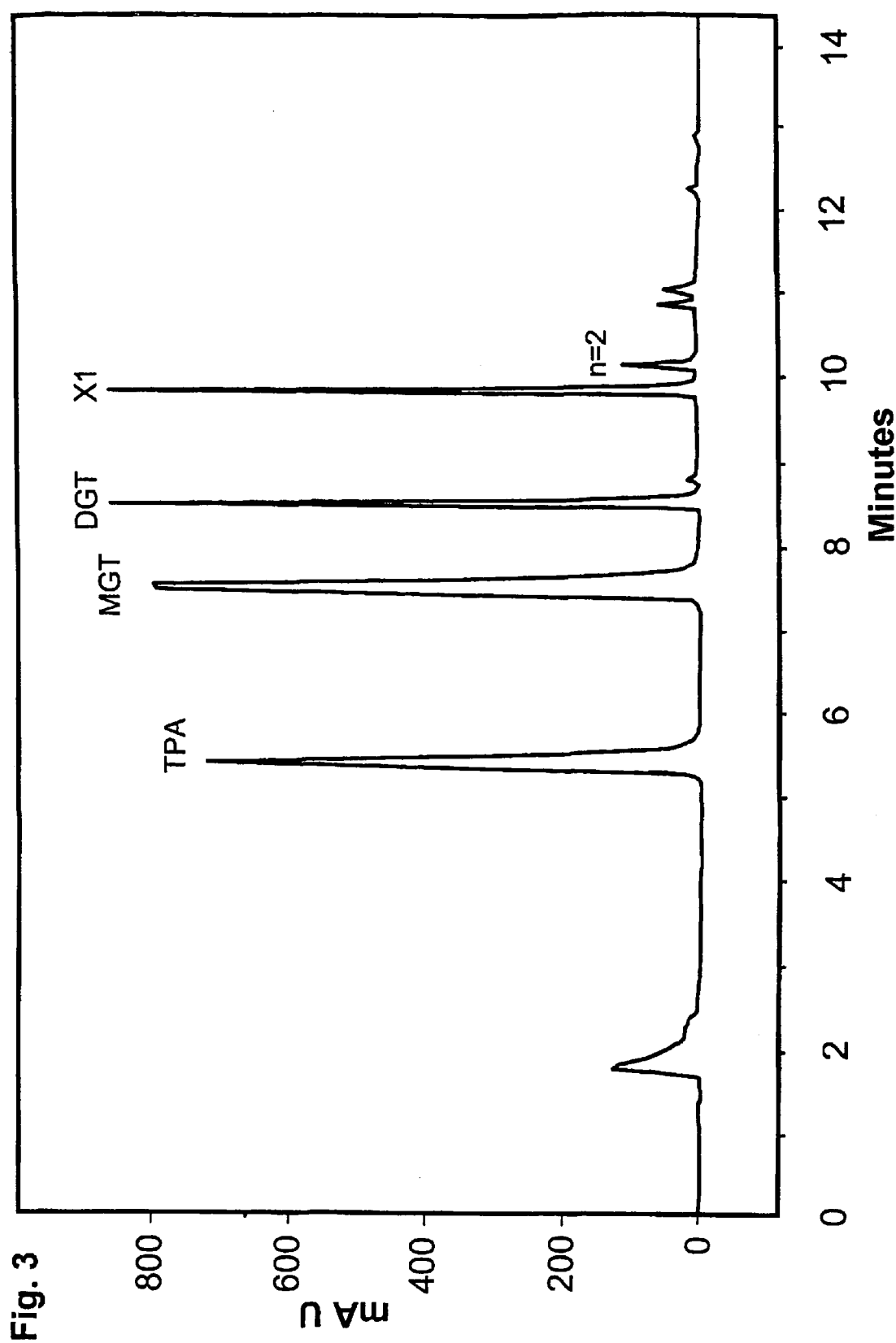
FIG. 3 is an HPLC chromatogram identifying all species present in the reaction of Example 3.

The HPLC chromatogram shown in FIG. 3 shows the main aromatic products formed and the formation of terephthalic acid diethyleneglycolesterdiacetate.

EXAMPLE 4

This example describes the continuous conversion of terephthalic acid and isophthalic acid in acetic acid suspension with ethylene glycol to a polyester product. For this purpose a 1 kg/h ethyleneglycol stream is dosed into a 5 kg/h stream of a saturated solution comprising 70 wt % acetic acid, 25 wt % terephthalic acid, 0.5 wt % isophthalic acid and 4.5 wt % water at a temperature of 200° C. and a pressure of 25 bar and loaded into a first stirred reactor for 60 minutes at 5 bar and a temperature of 250° C. The reaction product was loaded into a second, downstream stirred reactor for reaction at 1.5 bar and 260° C., for 180 min, achieving thereby a conversion of 92%.

The polyester product was pre-condensed in another reactor and subsequently processed in a polycondensation reactor to a polyester having an intrinsic final viscosity of 0.63 dl/g and carboxyl end-groups content of 20 mmol/kg.

What is claimed is:

1. A method for manufacturing polyethylene terephthalate from terephthalic acid and ethylene glycol in the presence of a monocarboxylic acid, which comprises the steps of:
   (a) in a first reaction step, esterifying a saturated solution of terephthalic acid with ethylene glycol in a mixture of a monocarboxylic acid with water or another suitable solvent to obtain as an intermediate a monoethylene glycol terephthalate carboxylate, a diethylene glycol terephthalate carboxylate, or oligomers thereof, wherein the ethylene glycol is employed in a molar amount equal to or less than the sum of the molar amounts of terephthalic acid and monocarboxylic acid together; and
   (b) in a second reaction step, converting the monoethylene glycol terephthalate carboxylate or the diethylene glycol terephthalate carboxylate, or the oligomers thereof to polyethylene terephthalate containing less than 0.1% by weight of diethylene glycol.

2. The method for manufacturing polyethylene terephthalate defined in claim 1 wherein according to step (a) the monocarboxylic acid is completely or partially pre-esterified with ethylene glycol.

3. The method for manufacturing polyethylene terephthalate defined in claim 1 wherein according to step (a) the ethylene glycol and the terephthalic acid are first reacted to form monoethylene glycol terephthalate, diethylene glycol terephthalate or oligomers thereof, having free hydroxy end groups, which are then partially or totally esterified with the monocarboxylic acid to form the monoethylene glycol terephthalate carboxylate, the diethylene glycol terephthalate carboxylate, or oligomers thereof.

4. The method for manufacturing polyethylene terephthalate defined in claim 1 wherein according to step (a) additional aromatic carboxylic acids besides terephthalic acid are added in relatively small amounts.

5. The method for manufacturing polyethylene terephthalate defined in claim 1 wherein according to step (a) additional aliphatic or cycloaliphatic diols besides ethylene glycol are added in relatively small amounts.

6. The method for manufacturing polyethylene terephthalate defined in claim 1 wherein according to step (a) acetic acid is used as the monocarboxylic acid which can be mixed with relatively small amounts of other carboxylic acids.

7. The method for manufacturing polyethylene terephthalate defined in claim 1 wherein according to step (a) the concentration of the monocarboxylic acid in the reaction mixture is between 5 and 99% by weight calculated on the basis of the weight of the terephthalic acid employed.

8. The method for manufacturing polyethylene terephthalate defined in claim 1 wherein according to step (a) instead of ethylene glycol, ethylene glycol diacetate is used.

9. The method for manufacturing polyethylene terephthalate defined in claim 1 wherein according to step (a) the reaction is carried out in the presence of a catalyst.

10. The method for manufacturing polyethylene terephthalate defined in claim 9 wherein the catalyst is an element or its compounds selected from the group consisting of Mg, Ca, Ba, Zn, Co, Al, Sb, Ti, Sn, Ge or a combination of these elements or their compositions.

11. The method for manufacturing polyethylene terephthalate defined in claim 1 wherein according to step (a) the molar ratio of terephthalic acid to ethylene glycol is 0.1:1 up to 10:1 and the molar ratio of the sum of the monocarboxylic acid and the terephthalic acid to the ethylene glycol is 1:1 to 20:1.

12. The method for manufacturing polyethylene terephthalate defined in claim 1 wherein according to step (a) the terephthalic acid is present in a saturated solution in an amount between 0.1 up to 50% by weight, calculated based on the total reaction mixture.

13. The method for manufacturing polyethylene terephthalate defined in claim 1 wherein according to step (b) the monoethylene glycol terephthalate carboxylate, the diethylene glycol terephthalate carboxylate, or the oligomers thereof are converted to polyethylene terephthalate by transesterification and subsequent polycondensation.

14. The method for manufacturing polyethylene terephthalate defined in claim 3 wherein the monoethylene glycol terephthalate, diethylene glycol terephthalate or oligomers thereof, having free hydroxy end groups are prepared at a temperature between 100 and 350° C. at a pressure between 700 mbar up to 100 bar.

15. The method for manufacturing polyethylene terephthalate defined in claim 1 wherein following step (a) unreacted monocarboxylic acid, ethylene glycol and water are removed from the reaction mixture by rectification.

16. Polyethylene terephthalate prepared by the process defined in claim 1.

17. A method for manufacturing polyethylene terephthalate from terephthalic acid and ethylene glycol in the presence of a monocarboxylic acid, which comprises the steps of:
   (a) preparing a terephthalic acid diethylene glycol ester dicarboxylate and/or its oligomers by esterifying a solution of terephthalic acid in a reaction mixture with ethylene glycol in the presence of a monocarboxylic acid or a mixture of a monocarboxylic acid with water or another suitable solvent; and
   (b) transesterifying the terephthalic acid diethylene glycol ester dicarboxylate with additional ethylene glycol to obtain a reaction product and subsequently polycondensing the reaction product to obtain the polyethylene terephthalate containing less than 0.1% by weight of diethylene glycol.

18. A method for manufacturing polyethylene terephthalate from terephthalic acid and ethylene glycol in the presence of acetic acid, which comprises the steps of:
   (a) esterifying a saturated solution of terephthalic acid with ethylene glycol in a reaction mixture in the presence of acetic acid to obtain as an intermediate monoethylene glycol terephthalate acetate, terephthalic acid diethylene glycol ester diacetate, or oligomers thereof, wherein the ethylene glycol is employed in a molar amount equal to or less than the sum of the molar amounts of terephthalic acid and acetic acid together; and
   (b) converting the monoethylene glycol terephthalate acetate or the terephthalic acid diethylene glycol ester diacetate, or the oligomers thereof to polyethylene terephthalate containing less than 0.1% by weight of diethylene glycol.

* * * * *